Figure 1:
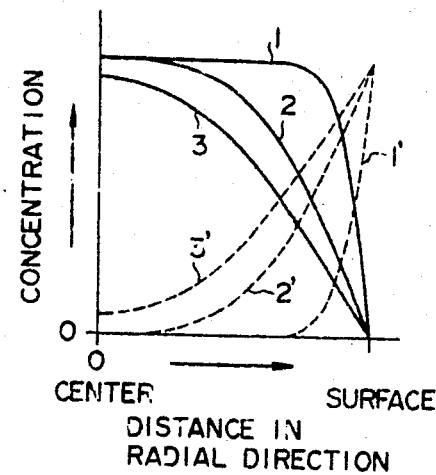

United States Patent [19]
Yoshiyagawa et al.

[11] 3,859,103
[45] Jan. 7, 1975

[54] OPTICAL GLASS BODY HAVING A REFRACTIVE INDEX GRADIENT

[75] Inventors: Mitsugi Yoshiyagawa, Takarazuka; Yoshiro Ikeda, Nishinomiya; Kohichi Nishizawa, Itami, all of Japan

[73] Assignee: Nippon, Selfoc Co., Ltd., Tokyo, Japan

[22] Filed: Mar. 8, 1973

[21] Appl. No.: 339,066

[52] U.S. Cl............. 106/50, 106/53, 106/54, 65/30
[51] Int. Cl............................................. C03c 3/08
[58] Field of Search.... 350/175 GN, 96 WG; 65/30, 65/4; 106/54, 53, 50

[56] References Cited
UNITED STATES PATENTS

| | | | |
|---|---|---|---|
| 3,614,197 | 10/1971 | Nishizawa et al. | 350/96 WG |
| 3,650,598 | 3/1972 | Kitano et al. | 350/96 R |
| 3,653,933 | 4/1972 | Tsunekawa | 106/54 |
| 3,666,347 | 5/1972 | Kitano et al. | 350/96 B |
| 3,817,731 | 6/1974 | Yoshiyagawa | 106/50 X |

FOREIGN PATENTS OR APPLICATIONS

2,004,043  11/1969  France

*Primary Examiner*—Winston A. Douglas
*Assistant Examiner*—John F. Niebling
*Attorney, Agent, or Firm*—Wenderoth, Lind & Ponack

[57] ABSTRACT

An optical glass body comprising at its central axis 50 to 70 mol % of $SiO_2$, 10 to 30 mol % of $B_2O$, 1 to 25 mol % of $Tl_2O$ and $R_2O$, the total proportion of $Tl_2O$ and $R_2O$ being 10 to 30 mol %, the concentration of the thallium ions contained in said glass body gradually decreasing from its central axis to its peripheral surface, with the consequence that the refractive index of the glass body continuously decreases from the central axis of the glass body to its peripheral surface, wherein R is at least one component of the group consisting of the alkali metals.

10 Claims, 2 Drawing Figures

OPTICAL GLASS BODY HAVING A REFRACTIVE INDEX GRADIENT

This invention relates to an optical glass body and, in particular, to an optical glass body having a refractive index gradient that continuously decreases from the central axis to the peripheral surface as a result of the substitution of the thallium ions contained in the glass by external alkali metal ions.

The glass body in which the refractive index continuously decreases from the central axis to the pheripheral surface (hereinafter to be referred to as "a refractive index gradient type glass body") possesses a light-focusing property and hence is valuable as glass fibers for transmitting light. Further, when the refractive index gradient type glass rod is cut into a given length, a cylindrical lens having the same lens function as a convex lens is obtained.

The preferred refractive index distribution of a refractive index gradient type glass body is that wherein the distribution of the refractive indices decreases from the central axis to the peripheral surface parabolically; i.e., it is a distribution that is substantially represented by the equation $$N = N_o (1 - ar^2)$$

wherein $N_o$ is the refractive index at the center of a cross section of the glass body perpendicular to the central axis thereof, $r$ is the distance from the center in the radial direction, $a$ is a positive constant, and $N$ is the refractive index.

As disclosed, for example, in Japanese Patent Application Publication No. 816/1972 (U.S. Serial No. 147,256, British Patent Specification No. 1,266,521 and German Patent No. 1,913,358), there is known as a method of producing this refractive index gradient type glass body that which comprises contacting a glass rod (or a glass fiber) containing thallium with a molten salt of an alkali metal to effect the substitution of the alkali metal ions for the thallium ions contained in the glass rod, the substitution being effected in an increasingly greater amount nearer the surface thereof to thereby form the desired refractive index gradient in the glass rod.

As the starting glass for use in the production of the refractive index gradient type glass in accordance with the foregoing method, a glass having the composition $SiO_2$ 70.2 mol %, $Na_2O$ 17.0 mol %, $Tl_2O$ 3.3 mol %, and $PbO$ 9.5 mol % has been widely used.

This composition has been used for the following reasons. The commercially usable glasses can be roughly classified into those in which $SiO_2$ is the principal ingredient, those in which $B_2O_3$ is the principal ingredient and those in which $P_2O_5$ is the principal ingredient. Of these, the glass whose principal ingredient is $SiO_2$ has been chosen because it is not readily devitrified. Of the glass whose principal ingredient is $SiO_2$, i.e., the silicate glass, that containing PbO was chosen because of its high transparency and the fact that products of uniform quality could be readily obtained, as well as its ease of being hot-formed into the desired shape, since its change of viscosity with a change in temperature was relatively small. Further, $Tl_2O$ was chosen for obtaining a relatively great refractive index gradient. On the other hand, $Na_2O$ was used for facilitating the melting and hot forming of the glass. As result of much research, the glass of the foregoing composition has been used hitherto as the standard for the reason that it most satisfactorily satisfies the conditions such as that it is not readily devitrified, that its weatherability is relatively good, that it is not readily corroded when it is brought into contact with the molten salt for exhanging ions, and that its melting and hot forming (e.g., forming into rod or fiber shape) are readily accomplished.

However, the conventional glass of a composition such as above described had the following shortcomings. (i) Since the melting temperature is a relatively high temperature of about 1300°C., some platinum dissolves into the glass when the glass is melted with a platinum crucible to become the cause of the absorbtion and scattering of light. Further, since thallium is highly volatile, difficulty is experienced in forming at elevated temperatures a glass containing thallium homogeneously. (ii) A relatively long period of time is required in carrying out the ion-exchange treatment in the molten salt of an alkali metal. (iii) The weatherability of the glass formed is somewhat poor.

In general, the transparency of an optical glass body preferably should be high and strial in the body (the undesirable portion in which the refractive index is non-homogeneous) should be small. As factors which impair the achievement of high transparency, there can be named the light absorbtion of the transition metal ions as typified by Fe, Ni and Co, the scattering and absorbtion of light due to colloidal platinum, and the scattering of light due to bubbles and phase separation. In order to obtain glass of high transparency, the raw material should be of high purity and of such a composition that does not separate into phases and has a small coefficient of light absorption, and also such a glass batch should be melted while preventing the mixing of platinum in the material and inhibiting the occurrence of residual bubbles. On the other hand, in order to achieve a high homogeneity, a platinum crucible is usually used for preventing the formation of striae that result on the account of the dissolution (elution) of the crucible material. The amount of platinum dissolved (eluted) is affected in an exponential function manner by the melting temperature. A slight rise in the melting temperature causes an abrupt increase in the amount dissolved. Hence, it is strongly desired that the melting temperature of the glass be maintained at as a low temperature as possible. Further, in melting a glass containing thallium, consideration must be given to the fact that the thallium ions are more instable in glass than the other alkali metal ions, e.g., $Na^+$ and $K^+$. In other words, the introduction of $Tl_2O$ generally results in greatly aggravating the tendency to devitrification and weathering properties of glass. Furthermore, $Tl_2O$ is an ingredient which readily volatillizes, and hence when the melting temperature is high, vigorous volatization takes place to render it a difficult matter to effect the incorporation in the glass of the $Tl_2O$ in a large amount. In addition, it becomes exceedingly difficult to obtain a homogeneous glass. In consequence, the resolving power of the resulting lens suffers. In the case of a glass composition in which the thallium ions are not so compatible, the volatilization of thallium is so vigorous that difficulty is experienced in incorporating $Tl_2O$ in a large proportion. Further, $Tl_2O$, when used as a glass component, lends itself to difficult handling partly because of its tendency to color the glass. Now, if the volatilization of thallium is reduced in melting a glass containing the thallium ions, a homogeneous glass becomes more readily obtainable. Since the volatilization of thallium increases in an exponential function manner with a rise in the temperature, from the standpoint of achieving a higher homogeneity, the reduction in the melting temperature is strongly desired. The conventional method of producing the refractive index gradient type glass body comprises dipping a thallium ion-containing glass rod in a molten bath of an alkali metal salt, say, potassium nitrate, for a suitable period of time to effect the ion exchange of the thallium ions contained in the glass for the potassium ions contained in the salt bath, thus obtaining a glass body having the required refractive index distribution. For obtaining a distribution of the refractive indices in which there is a continuous reduction from the central axis to the periphery, it is necessary to ensure that in carrying out the ion-exchange treatment the ion exchange takes place to a deep portion of the glass rod near its axis. For obtaining the required refractive index distribution, the temperature of the salt bath and the dipping time are controlled. In proportion as the temperature rises, the speed of the ion exchange becomes great. Hence, it is possible to shorten the time of the ion-exchange treatment, but this becomes undesirable if the temperature of the salt bath is raised too much, since softening and deforming of the glass rod being treated take place when the temperature is too high. The maximum temperature of the salt bath to be used in carrying out the ion-exchange treatment without causing a deformation of the glass rod is that temperature at which the viscosity of the glass rod becomes about $10^{10}$ poises. The dipping time necessary becomes greater as the diameter of the glass rod to be treated becomes great. When carrying out the ion-exchange treatment of a glass rod having a diameter within a given range, a reduction in the proper salt treatment time is strongly desired for enhancing the efficiency of the salt treatment as well as to avoid the devitrification of the glass during its treatment. For achieving this end, it is desired to elevate the temperature of the glass rod at which its viscosity becomes $10^{10}$ poises. Further, there are occasions when the refractive index gradient type glass body are installed for prolonged periods of time in places where humidity is high. In such cases, corrosion of the surface of the glass takes place to result in impairment of the transmission of light. Hence, it is desired that the glass body possesses weatherability.

The refractive index gradient type glass body was produced from the glass bodies having the conventional compositions in the following manner. First, the ion-exchange treatment is carried out by dipping a glass rod of 1-mm diameter for 20 days in a 460°C. molten potassium nitrate bath, whereupon the concentration of the thallium at the axis of the rod remains practically the same as that before the treatment but the concentration of thallium demonstrates a gradual reduction from the axis of the rod towards its peripheral surface, while the concentration of potassium demonstrates a gradual increase from the axis of the rod towards the peripheral surface thereof. As a result of the distribution of thallium in this manner, inside the rod, a distribution of the refractive indices as indicated by the aforesaid equation $N = N_0 (1 - ar^2)$ is formed. Therefore, for obtaining a glass fiber to be used in light transmission, the glass rod is heat-drawn to form a light-transmitting member having a diameter of about 0.1 mm. Further, when this rod is then cut cross-sectionally in a length of 4.1 mm and the two ends are polished, a refractive index gradient type cylindrical lens having a focal length of 1.6 mm, an aperture angle of 32 degrees and a resolving power of 400 lines per millimeter is produced. The term "aperture angle", as there used, represents the limiting angle of the width of the actual field of view of the lens and is an angular value two times the critical incidence angle $\theta c$, i.e. $2\theta c$, the critical incidence angle being an angle formed by light which passing at one end of the cylindrical lens reaches the other end without colliding with the side surface of the lens. When the length of the cylindrical lens is equal to or greater than $\pi/(2\sqrt{2a})$, where $a$ is the constant of the aforesaid equation of the distribution of the refractive indices, the aperture angle $2\theta c$ can be expressed by the equation $$2\theta c = 2 \sin^{-1} \sqrt{2N_0 \cdot \Delta N}$$

wherein $\Delta N$ is the difference between the refractive index at the sentical axis of the lens, $N_0$, and the refractive index at the peripheral surface, $N_1$, i.e. $N_0 - N_1$. In proportion as the length of the lens becomes shorter than $\pi/(2\sqrt{2a})$, the aperture angle gradually becomes larger. On the other hand, when the length of the lens becomes shorter than $\pi/(2\sqrt{2a})$, the focal length increases, with the consequence that the depth of focus becomes less. Since this is undesirable, most often chosen is a lens whose length is about equal to $\pi/(2\sqrt{2a})$. Hence, the value of the aperture angle is defined as being that which is about equal to or greater than $\pi/(2\sqrt{2a})$. Further, the dissolving power, as here used, denotes the ability of the lens to transmit the detailed portions of the object being viewed, and it is expressed by the maximum number of lines that can be clearly discerned in the image of parallel lines (the object being riewed).

The advantage of the refractive index gradient type lens over the conventional lens having a curved surface resides in (1) the fact that a lens of exceedingly small aperture of the order of 0.3 - 3 mm can be obtained without undergoing a complicated process of polishing a curved surface but by merely making the end surfaces flat; (2) the fact that when for use as an objective lens the refractive index gradient type lens is designed such that its focal length is of minimum length, i.e., a lens length about equal to $\pi/(2\sqrt{2a})$, a lens having an exceedingly great depth of focus, i.e., in which objects in the range from several millimeters ahead to infinity are in focus, is obtained; and (3) the fact that despite the lens is of small aperture, the resolving power is good. Its application include its use singly or in combinations of a plurality thereof as minute optical systems, for example, as the distal objective lens of a fiberscope or a needle-like endoscope or for use in a reading apparatus of computers. However, an aperture angle of the order of 32 degrees of the conventional refractive index gradient type lens was not wide enough for use as the distal objective lens of fiberscopes and needlelike endoscopes, and the development of a refractive index gradient type lens of wide aperture angle exceeding 45 degrees was strongly desired. For enlarging the aperture angle, the value of $2N_0 \cdot \Delta N$ must be made greater. As a practical matter, the value of $N_0$ cannot be made so great. Hence, it becomes necessary to enlarge the value of $\Delta N$ for enlarging the aperture angle. In the relationship between the aperture angle $2\theta c$ and $\Delta N$ when $N_0$ is fixed at 1.60, it is apparent when substitutions of numerical values are made in the aforesaid equation that the values of $\Delta N$ corresponding to aperture angles 30 degrees and 60 degrees are 0.020 and 0.078, respectively. Thus, for enlarging the aperture angle from 30 degrees to its double of 60 degrees, the $\Delta N$ must be made about four times. As a glass composition to be used for a refractive index gradient type lens having a large refractive index difference $\Delta N$, $Tl_2O$ becomes an indispensable ingredient when considered from the point that a great $\Delta N$ can be obtained with a relatively small change of concentration and the point that the time required for the ion-exchange treatment is relatively short. For obtaining an aperture angle exceeding 45 degrees, the refractive index difference $\Delta N$ must be above about 0.05 when the ion-exchange treatment has been carried out, and one of the criteria is that the glass composition contains $Tl_2O$ in an amount exceeding 5.5 mol%.

The present invention will now be more fully described below.

Figure 2:
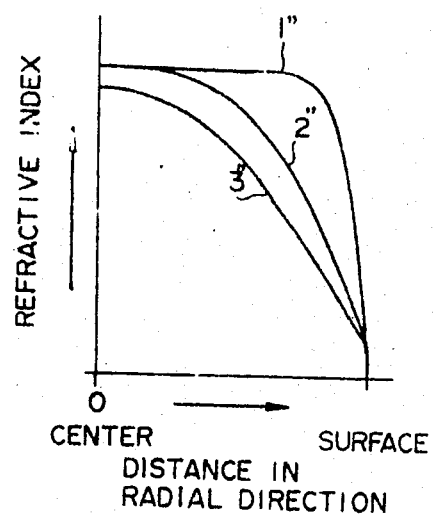

FIG. 1 shows the concentrations of ions at a radial distance from the central axis in a cross section perpendicular to the central axis of a glass rod. FIG. 2 shows a refractive index at a radial distance from the central axis in a cross section perpendicular to the central axis of a glass rod.

With a view to finding a glass which as compared with the conventional refractive index gradient type glass, is homogeneous, has less striae and excels in transparency and weatherability, as well as in which the ion-exchange treatment can be accomplished in a relatively short period of time, we researched into the various types of glasses such as those of the silicate, borosilicate, borate and phosphate types. In consequence, it was found that as a refractive index gradient type glass suitable for optical communication and lens purposes a glass comprising 50 – 70 mol% $SiO_2$, 10 – 30 mol % $B_2O_3$, 1 – 25 mol % $Tl_2O$ and $R_2O$, the total proportion of $Tl_2O$ and $R_2O$ being 10 – 30 mol % has excellent properties for these purposes. In the foregoing composition, the R stands for alkali metal ions, included being the ions of Na, K, Li, Cs and Rb.

The invention glass contains 1 – 25 mol % of $Tl_2O$. Thallium is an indispensable ingredient of the glass according to the present invention, for the reasons that a relativly great refractive index difference $\Delta N$ can be obtained with a relatively small change in its concentration and that a relatively short ion-exchange treatment time will do. As a glass body (glass fiber) for optical communication use, that containing 1 – 5.5 mol % of $Tl_2O$ is preferred. When the content of $Tl_2O$ is less than 1 mol %, this is not desirable from the practical standpoint since the value of the refractive index difference $\Delta N$ becomes less than 0.005, with the consequence that the allowable radius of curvature of the light-transmitting glass body becomes large. On the other hand, a $Tl_2O$ content of 5.5 mol % is sufficient for obtaining the necessary refractive index difference, and any increase beyond this amount is unnecessary.

In the case of a refractive index gradient type lens, the aperture angle of the lens is determined by the concentration of $Tl_2O$. That is, the aperture angle becomes larger as the refractive index difference $\Delta N$ is increased. For obtaining an aperture angle exceeding 45 degrees, the content of $Tl_2O$ must be greater than 5.5 mol %. The aperture angle can be enlarged by increasing the content of the $Tl_2O$, but when the content of $Tl_2O$ exceeds 25 mol %, the glass becomes very easily devitrified and tends to become undesirably colored. In consequence, as a practical matter, the content of $Tl_2O$ cannot exceed 25 mol %.

The invention glass contains 50 – 70 mol % of $SiO_2$. When the content of $SiO_2$ is less than 50 mol %, the melting temperature of the glass is low, but this is not practical, because a pronounced degradation takes place with respect to the tendency to devitrification and weather ability of the glass. On the other hand, when the content of $SiO_2$ is increased, an abrupt rise takes place in the melting temperauure of glass. An increase in the content of $SiO_2$ beyond 70 mol % is not to be desired in view of the formation of striae due to the dissolution of the platinum of the crucible and the volatilization of the thallium. Hence, $SiO_2$ is preferably contained in an amount of 50 – 65 mol %. When the content of $SiO_2$ exceeds 65 mol %, a commensurate improvement in the weatherability and the tendency to devitrification is not achieved with the increased addition of $SiO_2$, and an overall evaluation indicates that it is inferior to the case where the content of $SiO_2$ is from 50 mol % to 65 mol %.

Further, with a view to lowering the melting temperature of the glass, improving its weatherability, preventing the devitrification of the glass during the step of the ion-exchange of the glass rod and reducing the bath immersion time during the ion-exchange operation, the composition of the present invention contains 10 – 30 mol % of $B_2O_3$. When the content of $B_2O_3$ is less than this, the effect of greatly reducing the melting temperature by the introduction of $B_2O_3$ instead of $SiO_2$ is not achieved, and there is a tendency to a reduction in transparency and formation of striae due to the dissolution of platinum and volatilization of thallium. Further, the weatherability and tendency to devitrification are also not as satisfactory as the case where the content of $B_2O_3$ is in the range of 10 – 30 mol %. The glass rod is submitted to an ion-exchange treatment during the process of producing the glass body, but if in this case the content of $B_2O_3$ is less than 10 mol %, the glass becomes unstable during the ion-exchange step to result in devitrification frequently taking place. Further, the $B_2O_3$ functions to raise the specific temperature of the glass to that where a viscosity of $10^{10}$ poises of glass — a viscosity most suitable for the dipping of the glass in the salt bath for effecting the ion exchange — is achieved. By incorporating the $B_2O_3$ in the glass in excess of 10 mol %, the specific temperature of the glass and hence that of the salt bath are raised, with the consequence that the ion-exchange treatment time can be shortened. Thus when the content of $B_2O_3$ is less than 10 mol %, the composition is not suitable for use as a composition for producing a refractive index gradient type glass body. When the content of $B_2O_3$ exceeds 30 mol %, the glass not only tends to devitrify during its melt-shaping and ion exchange but also its weatherability suffers. In addition, there is the objection that the change of viscosity with a change in temperature becomes great (i.e., the glass becomes what is called "short") to cause difficulty in hot forming of the glass.

The content of ($Tl_2O + R_2O$) must be in the range of 10 – 30 mol %. The $R_2O$ component is an indispensible component and is present in an amount of at least 6.5 mol %. When this amount is less than 10 mol %, an abrupt rise takes place in the melting temperature, and moreover there is a tendency to phase separation taking place as well as a tendency to the formation of striae due to the volatilization of $Tl_2O$. The phase separation of the glass becomes the cause of light scattering and results in loss of light. Hence, this is especially objectionable in the case of optical communication. On the other hand, when the content of ($Tl_2O + R_2O$) exceeds 30 mol %, the melting temperature is low and the melting operation is facilitated, but since the weatherability and tendency to devitrification are aggravated, this also is not desirable from the practical standpoint. Again, there is the objection that there is a tendency to an increase in light loss of the glass when the content of ($Tl_2O + R_2O$) exceeds 30 mol %. That is to say, glass contains such transition metal ions as Fe, Ni and Co as impurities, and the light absorption by these ions become one of the causes of the light transmission loss of glass. Now, there is the case where these ions have a coordination number of 4 and that where they have a coordination number of 6. The light absorption with respect to the light of relatively long wavelength that is to be transmitted is greater in the case of the ions having a coordination number 4 than that of the ions having a coordination number 6. When the content of ($Tl_2O + R_2O$) is increased, an increase takes place in the amount of the ions having the coordination number 4 and as a consequence, the light absorption loss increases even though the amount of the transition metals contained are the same. The sodium ion is to be most preferred as the alkali metal R when the cost and properties (tendency to devitrification, etc.) are taken into consideration.

The refractive index gradient type glass body of the present invention contains $Tl_2O$. When the content of $Tl_2O$ is increased, the glass suddenly becomes unstable, and it becomes susceptible to devitrification and, in addition, its weatherability becomes poor. At the stage at which the glass has not been yet submitted to the ion-exchange treatment step, a satisfactory glass in which no devitrification is seen can be obtained even in the case where the ingredients are only $SiO_2$, $B_2O_3$, $Tl_2O$ and $R_2O$. However, since in the production of a refractive index gradient type glass body the glass is submitted for a considerable period of time to an ion-exchange treatment in a temperature zone at which the viscosity of the glass is about $10^{10}$ poises — a temperature at which the glass is susceptible to devitrification — a composition not incorporated with an ingredient such as $R'O$ tends to devitrify readily. For preventing this devitrification, it is preferred that the invention glass composition contains at least one of the compounds of $R'O$, $R''_2O_3$ (exclusive of $B_2O_3$) and $R'''O_2$ (exclusive of $SiO_2$) in a total amount of 1 - 20 mol %. In general, the melting temperature of glass becomes higher as a result of the incorporation of $R'O$, $R''_2O_3$ and $R'''O_2$. Hence, the incorporation of these compounds in an amount exceeding 20 mol % is not to be desired, since the melting temperature rises, with the consequence that it becomes difficult to obtain a homogeneous glass. In other words, preferably the total of $SiO_2 + B_2O_3 + Tl_2O + R_2O$ accounts for at least 80 mol % of the glass composition. As $R'$, there are such as $Mg^{2+}$, $Ca^{2+}$, $Ba^{2+}$, $Zn^{2+}$ and $Pb^{2+}$; as $R''$, there is such as $Al^{3+}$; and as $R'''$, there are such as $Sn^{4+}$ and $Ti^{4+}$, but from the standpoint of improving on the tendency to devitrification, $Mg^{2+}$, $Ca^{2+}$ and $Zn^{2+}$ were satisfactory. Of these, especially preferred was $Zn^{2+}$ since there was hardly any rise in melting temperature by its use. By the incorporation of essentially 2 - 15 mol % of a ZnO ingredient, a glass which was not very readily devitrified during the ion-exchange treatment and moreover having good weatherability was obtained.

The invention glass composition may also contain such other trace ingredients as, for example, $As_2O_3$ as fining agent. On the other hand, except for those impurities whose entry cannot be avoided, it is preferred that steps be taken to ensure that such oxides of transition metals that hinder the transmission of light do not become admixed in the glass. It is especially important in the case of the glass to be used for optical communication purposes to ensure that the amount of these impurities be brought to as close as possible to zero.

A glass rod of circular cross section (or fiber) having the glass composition of the present invention is contacted with an alkali metal ion source, for example, a molten salt of sodium or potassium thereby effecting the substitution of the alkali metal ions for the thallium ions that are contained in the glass rod, the substitution being effected in an increasingly greater amount nearer the surface of the glass rod rather than the interior thereof to thus obtained a refractive index gradient type glass body.

Variations in the distribution of these ions and the distribution of the refractive indices with the passage of time during which the glass rod is brought into contact with the alkali metal ion source will be described by reference to FIGS. 1 and 2.

FIG. 1 shows the concentration of the ions at a radial distance from the central axis in a cross section perpendicular to the central axis of the rod.

In the initial stage of the contact, the ion exchange occurs at that part of the glass rod near its surface. Hence, as shown by the solid line 1 in FIG. 1, the concentration of the thallium ions in the inside of the rod in the vicinity of the central part thereof at this time equals the concentration before the ion-exchange treatment, but the concentration of the thallium ions decreases abruptly towards the surface at that part close to the surface of the rod. The concentration of ions diffusing from the ion source to the inside of the glass rod, for example, the potassium ions, decreases from the surface towards the inside, and at the central part of the rod, the concentration of the potassium is zero, as is shown by the dotted line 1' in FIG. 1. With the passage of the contacting time, the ion exchange proceeds to the inside of the glass rod; in other words, the potassium ions diffuse further inside. The concentrations of thallium and potassium ions at the time when the potassium ions have almost reached the center are shown by 2 and 2' in FIG. 1. As the ion exchange proceeds further, the concentrations of the thallium and potassium ions attain the values shown by 3 and 3' of FIG. 1. The concentrations of the thallium ions, as shown by 2 and 3, in FIG. 1 show a decrease from the center to the surface at a ratio corresponding to about the square of the radial distance. Thus, the concentration of thallium ions at the center of the rod becomes lower than that before the ion exchange, and the concentration of potassium ions at the center of the rod becomes higher. The refractive index distributions of the glass rod when the concentrations of the ions are at the three stages shown. In FIG. 1 are shown by curves 1", 2" and 3" in FIG. 2 corresponding respectively to the thallium ion concentrations 1, 2 and 3 in FIG. 1. The refractive index curve 1" does not satisfy the equation $N = N_o (1 - ar^2)$, but the curves 2" and 3" satisfy this equation. Accordingly, the proper contacting time is determined so that the thallium concentrations shown by 2 and 3 and the refractive index distributions shown by 2'' and 3'' are achieved. Too long a contacting time is undesirable, since it renders the gradient of the concentrations of the ions and the gradient of the refractive indices gentle, with the consequence that the necessary $\Delta N$ (the difference in the refractive indices between the center and the surface) cannot be obtained.

If the glass rod before the ion exchange treatment contains thallium ions and ions of an alkali metal, for example, sodium, the concentration of the sodium ions usually shows curves similar to the concentrations of thallium ions 1, 2 and 3 as a result of the ion exchange. Since the sodium and potassium ions have greater rates of diffusion than the thallium ions, ion exchange may take place between the sodium ions contained in the glass rod and the potassium ions from the external source. However, the refractive index hardly changed by the ion exchange between sodium and potassium. Therefore, the gradients of the concentrations of these ions scarcely affect the gradient of the refractive indices of the glass rod, the refractive index gradient being formed mainly by the gradient of the concentration of the thallium ions.

In many cases, the concentration of thallium ions at the peripheral surface of the glass rod of this invention is almost zero, but it is not altogether necessary to render it zero. For example, at times, $\Delta N$ is controlled by adding a small amount of thallium ions to the source of alkali metal ions to be exchanged for the thallium ions contained in the glass. At such times, the concentration of the thallium ions at the peripheral surface does not become zero.

In the cross section perpendicular to the central axis of the glass body of the invention, the concentrations of the components other than $Tl_2O$ and $R_2O$, for example, $SiO_2$, $B_2O_3$, etc., are each maintained substantially constant in the radial direction. Further, the total concentration of $(Tl_2O + R_2O)$ in mol % in the foregoing cross section is also maintained substantially constant in the radial direction.

The temperature at which the homogeneous glass rod is contacted with the external ion source should be at least 400°C. in order for the thallium ions present in the glass rod to diffuse and move. However, if this temperature is too high, the glass tends to be deformed. Hence, the contacting temperature preferably should not exceed 600°C.

The so obtained refractive index gradient type glass rod is heat-drawn, as required, to attenuate its diameter, and thus is obtained the refractive index gradient type light-transmitting glass body having the desired refractive index distribution.

Further, when this glass rod is cut cross-sectionally perpendicular to the its central axis and the cut ends are polished, a rodlike or fiberlike refractive index gradient type lens having the desired refractive index gradient is obtained.

At its central axis the ion-exchanged glass body is composed of 50 – 70 mol % $SiO_2$, 10 – 30 mol % $B_2O_3$, 1 – 25 mol % $Tl_2O$, 10 – 30 mol % $(Tl_2O + R_2O)$ and other nonessential ingredients. The concentration of the thallium ions shows a continuous decrease decline from the central axis to the peripheral surface. On the other hand, the concentration of the alkali metal ion of the same class as the alkali metal in the salt bath shows a continuous increase from the central axis of the glass body to its peripheral surface.

The diameter of this refractive index gradient type glass body is usually 0.03 mm to 10 mm, and the difference in refractive indices between the central axis and peripheral surface of the glass body, $\Delta N$, is 0.005 to 0.15. In a light-transmitting glass body to be used for optical communication, the difference in refractive indices between the central axis and the peripheral surface, $\Delta N$, should preferably be in the range of 0.005 to 0.06, while the value of the constant $a$ in the equation of the refractive index distribution should be in the range of 0.02 cm$^{-2}$ to 20,000 cm$^{-2}$, and preferably 0.1 cm$^{-2}$ to 10,000 cm$^{-2}$. On the other hand, the difference in refractive indices between the central axis and the peripheral surface, $\Delta N$, of a glass member to be used as a lens should be in the range of 0.05 to 0.15, while the value of the constant $a$ in the equation of the refractive index distribution should be in the range of 0.1 cm$^{-2}$ to 1000 cm$^{-2}$, and preferably 0.5 cm$^{-2}$ to 300 cm$^{-2}$. The lens thus produced has an aperture angle of 45 to 80 degrees. Further, the focal length $f$ of this lens, as is well known, is expressed by the equation $$f = 1/N_o \sqrt{2a} \sin(\sqrt{2a}\, t)$$

where $t$ is the length of the lens. And the lens length at which the focal length becomes the shortest is expressed by $\pi/(2\sqrt{2a})$ multiplied by an odd number, the focal length being $1/(N_o \sqrt{2a})$. Now, when the parallel light rays are passed through a lens having this length, they come to a focus at the end surface of this lens. The lens made from the invention glass cut such that the focal length becomes a minimum has a focal length usually in the range of 14.0 mm to 0.3 mm.

Examples will now be given illustrating most preferred embodiments of the present invention.

In Table 1 are shown the properties of glass body A of the conventional standard composition, glass body B by way of comparison, and glass bodies Nos. 1 – 11 according to the present invention. Of the glass bodies according to the present invention, the seven glasses Nos. 1 – 7 are those which are especially suitable for optical communication purposes, while the four glasses Nos. 8 – 11 are those which are suitably used as lenses. These glass bodies are prepared from raw materials of substantially equal purity by being melted at the melting temperatures indicated in said table, using a platinum crucible. The refractive index of these glasses and the temperature at which their viscosity becomes $10^{10}$ poises are shown in the table. Glass rods having a diameter of 1.0 mm and a length of about 100 cm are prepared from these glasses. The resulting rods are then dipped in a molten salt bath of $KNO_3$ at the temperatures and periods of time indicated in Table 2 followed by removal from the bath. The glass rods so treated with the salt bath, excluding their two ends, have the glass compositions at the center and peripheral surface such as shown in Table 3 and moveover the refractive indices at the center and peripheral surface such as shown in Table 4. The proportion in which the ingredient $Tl_2O$ and $K_2O$ was confirmed to show respectively a continuous decrease and increase from the center of the glass rod to its peripheral surface. On the other hand, the refractive indices demonstrated a continuous decrease from the center of the glass rod to its peripheral surface. Furthermore, the distribution of these refractive indices was substantially as indicated by the aforesaid equation, the value of $a$ being as indicated in the foregoing Table 4.

As shown in Table 2, in the case of conventional glass composition, the period of time that the glass had to be dipped in the salt bath was a prolonged period of from 300 to 480 hours, whereas in the case of the invention glass compositions, a short dipping time of less than 250 hours was sufficient.

Table 1

|  | Conventional glass | | Starting glass used in production of invention glass | | | | | | | | | | |
|---|---|---|---|---|---|---|---|---|---|---|---|---|---|
|  | A | B | No. 1 | No. 2 | No. 3 | No. 4 | No. 5 | No. 6 | No. 7 | No. 8 | No. 9 | No. 10 | No. 11 |
| Glass composition (mol percent): | | | | | | | | | | | | | |
| $SiO_2$ | 70.2 | 67.2 | 60.0 | 60.0 | 65.0 | 57.4 | 60.0 | 53.0 | 57.0 | 58.2 | 55.9 | 61.5 | 51.0 |
| $B_2O_3$ | 0 | 8.3 | 15.0 | 20.0 | 15.0 | 14.3 | 15.0 | 25.0 | 14.0 | 19.3 | 18.7 | 21.0 | 11.0 |
| $Na_2O$ | 17.0 | 18.6 | 21.0 | 16.0 | 16.0 | 20.0 | 23.0 | 9.0 | 10.0 | 13.7 | 9.3 | 6.5 | 3.2 |
| $Tl_2O$ | 3.3 | 5.9 | 4.0 | 4.0 | 4.0 | 3.8 | 2.0 | 3.0 | 4.0 | 5.8 | 9.3 | 8.0 | 17.8 |
| $PbO$ | 9.5 | 0 | 0 | 0 | 0 | 0 | 0 | 0 | 0 | 0 | 0 | 0 | 0 |
| $ZnO$ | 0 | 0 | 0 | 0 | 0 | 4.4 | 0 | 10.0 | 5.0 | 3.0 | 6.8 | 3.0 | 12.0 |
| $K_2O$ | 0 | 0 | 0 | 0 | 0 | 0 | 0 | 0 | 10.0 | 0 | 0 | 0 | 5.0 |
| Melting temperature (°C.) | 1,300 | 1,350 | 1,150 | 1,200 | 1,250 | 1,200 | 1,200 | 1,250 | 1,200 | 1,150 | 1,200 | 1,250 | 1,200 |
| Refractive index | 1.60 | 1.585 | 1.55 | 1.54 | 1.54 | 1.55 | 1.53 | 1.54 | 1.55 | 1.580 | 1.625 | 1.605 | 1.680 |
| Temperature at which viscosity is $10^{10}$ poises | 460 | 480 | 520 | 550 | 560 | 520 | 540 | 590 | 520 | 510 | 500 | 520 | 490 |

Table 2

|  | Conventional glass | | Invention glass | | | | | | | | | | |
|---|---|---|---|---|---|---|---|---|---|---|---|---|---|
|  | A | B | No.1 | No.2 | No.3 | No.4 | No.5 | No.6 | No.7 | No.8 | No.9 | No.10 | No.11 |
| Salt bath temperature (°C.) | 460 | 480 | 520 | 550 | 560 | 520 | 540 | 590 | 520 | 510 | 500 | 520 | 490 |
| Dipping time (hr) | 480 | 300 | 96 | 72 | 72 | 96 | 96 | 100 | 96 | 200 | 180 | 180 | 220 |

TABLE 3

|  | Conventional glass | | | | Invention glass | | | | | | | | | |
|---|---|---|---|---|---|---|---|---|---|---|---|---|---|---|
|  | A | | B | | No. 1 | | No. 2 | | No. 3 | | No. 4 | | No. 5 | |
|  | Center | Surface | Center | Surface | Center | Surface | Center | Surface | Center | Surface | Center | Surface | Center | Surface |
| Glass composition (mol percent): | | | | | | | | | | | | | | |
| $SiO_2$ | 70.2 | 70.2 | 67.2 | 67.2 | 60.0 | 60.0 | 60.0 | 60.0 | 65 | 65 | 57.4 | 57.4 | 60 | 60 |
| $B_2O_3$ | 0 | 0 | 8.3 | 8.3 | 15.0 | 15.0 | 20.0 | 20.0 | 15 | 15 | 14.3 | 14.3 | 15 | 15 |
| $Na_2O$ | 6.0 | 5.0 | 6.2 | 5.2 | 7.0 | 6.0 | 6.0 | 5.0 | 6 | 5 | 7.0 | 6.0 | 8 | 7 |
| $Tl_2O$ | 3.3 | 0.5 | 5.9 | 0.8 | 4.0 | 0.8 | 4.0 | 0.8 | 4 | 0.8 | 3.8 | 0.8 | 2 | 0.3 |
| $PbO$ | 9.5 | 9.3 | 0 | 0 | 0 | 0 | 0 | 0 | 0 | 0 | 0 | 0 | 0 | 0 |
| $K_2O$ | 11.0 | 15.0 | 12.4 | 18.5 | 14 | 18.2 | 10.0 | 14.2 | 10 | 14.2 | 13.1 | 17.2 | 15 | 17.7 |
| $ZnO$ | 0 | 0 | 0 | 0 | 0 | 0 | 0 | 0 | 0 | 0 | 4.4 | 4.3 | 0 | 0 |

|  | Invention glass | | | | | | | | | | | |
|---|---|---|---|---|---|---|---|---|---|---|---|---|
|  | No. 6 | | No. 7 | | No. 8 | | No. 9 | | No. 10 | | No. 11 | |
|  | Center | Surface | Center | Surface | Center | Surface | Center | Surface | Center | Surface | Center | Surface |
| Glass composition (mol percent): | | | | | | | | | | | | |
| $SiO_2$ | 53.0 | 53.0 | 57.0 | 57.0 | 58.2 | 58.2 | 55.9 | 55.9 | 6.15 | 61.5 | 51.6 | 51.0 |
| $B_2O_3$ | 25.0 | 25.0 | 14.0 | 14.0 | 19.3 | 19.3 | 18.7 | 18.7 | 21.0 | 21.0 | 11.0 | 11.0 |
| $Na_2O$ | 3.0 | 2.5 | 3.0 | 2.7 | 4.5 | 3.5 | 3.0 | 2.5 | 2.3 | 1.5 | 1.4 | 1.0 |
| $Tl_2O$ | 2.7 | 0.3 | 3.7 | 0.4 | 5.8 | 0.8 | 9.3 | 1.5 | 8.0 | 1.2 | 16.8 | 2.2 |
| $PbO$ | 0 | 0 | 0 | 0 | 0 | 0 | 0 | 0 | 0 | 0 | 0 | 0 |
| $K_2O$ | 6.3 | 9.2 | 17.3 | 20.9 | 9.2 | 15.2 | 6.3 | 14.6 | 4.2 | 11.8 | 7.8 | 22.8 |
| $ZnO$ | 10.0 | 10.0 | 5.0 | 5.0 | 3.0 | 3.0 | 6.8 | 6.8 | 3.0 | 3.0 | 12.0 | 12.0 |

TABLE 4

|  | Conventional glass | | Invention glass | | | | | | | | | | |
|---|---|---|---|---|---|---|---|---|---|---|---|---|---|
|  | A | B | No. 1 | No. 2 | No. 3 | No. 4 | No. 5 | No. 6 | No. 7 | No. 8 | No. 9 | No. 10 | No. 11 |
| Refractive index at center | 1.60 | 1.585 | 1.55 | 1.54 | 1.54 | 1.55 | 1.53 | 1.54 | 1.55 | 1.580 | 1.625 | 1.605 | 1.675 |
| Refractive index at surface | 1.57 | 1.535 | 1.51 | 1.50 | 1.50 | 1.51 | 1.51 | 1.51 | 1.51 | 1.530 | 1.545 | 1.540 | 1.550 |
| Value of $a$ (cm.$^{-2}$) | 7.5 | 13 | 10.3 | 10.4 | 10.4 | 10.3 | 5.2 | 7.8 | 10.3 | 13 | 20 | 16 | 30 |
| Loss with $0.63\mu$ light (db/km.) | 220 | | 90 | 130 | 90 | 80 | 100 | 150 | 120 | | | | |
| Loss with $1.06\mu$ light (db/km.) | 130 | | 60 | 70 | 60 | 55 | 65 | 80 | 70 | | | | |
| Lens length equal to $\pi/(2\sqrt{2a})$ (mm.) | 4.1 | 3.1 | | | | | | | | 3.1 | 2.5 | 2.8 | 2.0 |
| Focal length (mm.) | 1.6 | 1.2 | | | | | | | | 1.2 | 1.0 | 1.1 | 0.8 |
| Depth of focus (mm.) | 2-∞ | 2-∞ | | | | | | | | 1-∞ | 1-∞ | 1-∞ | 1-∞ |
| Aperture angle (degrees) | 32 | 45 | | | | | | | | 48 | 60 | 54 | 75 |
| Resolving power lines/mm | 400 | 30 | | | | | | | | 500 | 500 | 500 | 500 |
| Weatherability test (hrs.) | 48 | 72 | 168 | 120 | 120 | >360 | 192 | 192 | 288 | 288 | 240 | 240 | 144 |

The glass rods Nos. 1–7 are fed from one end at the rate of about 2 cm per minute into a heated oven of about 680°C. having a length of about 20 cm, while the end of the rod is pulled at the rate of about 200 cm per minute, whereupon is obtained a glass fiber having a diameter of about 0.1 mm and a length of about 90 meters. The glass composition is mol % at the center and peripheral surface of this glass fiber and its refractive indices were found to be substantially identical to those of the glass rod before its stretching. The interval refractive index distribution was also as indicated by the aforesaid equation, it being found by measurement that the value of $a$ of said equation was in each case about 100 times the value of $a$ shown in Table 4. When the ends of this glass fiber were polished so that the end surfaces would become perpendicular to the central axis of the fiber and this was followed by passing a pulsed light of Helium-Neon lazer having a wavelength of 0.63 micron through the fiber from its end, the light was transmitted without setting up a delayed distortion of the light.

The transmission loss due to the absorption and scattering of light inside the fiber per unit length of fiber (/km) are shown in Table 4. Similar results were obtained when a pulsed light of YAG lazer was used instead of the Helium-Neon lazer. The transmission loss in this case is also shown in Table 4.

As shown in the foregoing table, whereas the loss in the case of the conventional glass composition with lights of 0.63 micron and 1.06 micron are 220 dB/km and 130dB/km, the lose in the case of the invention are 150 dB/km and 80 dB/km at the most. The principal reasons for this small light loss in the case of the invention glass are as follows. First, the invention glass can be melted at a relatively low temperature, i.e., a temperature of less than 1250°C. Hence, the light absorption coefficient due to the dissolution of platinum into the glass from the platinum crucible is small, and moreover the formation of striae due to the volatilization of the glass materials is prevented. Secondly, while the undesirable transition metal impurities that enter the glass from the raw materials are about the same in the case of both the invention glass and the conventional glass, it is believed that the loss of light is less in the case of the invention glass because the light absorption coefficient due to the transition metal impurities is smaller in the case of the invention.

Next, the rods Nos. 8 – 11 are cut cross-sectionally, and lenses of lengths $\pi/(2\sqrt{2a})$ having minimum focal lengths are obtained. The ends of each of the obtained lenses are polished to ensure that the ends of the lenses are provided with a plane surface perpendicular to the central axis of the rods. On measurement, the focal length, depth of focus, aperture angle and resolving power of these lenses were as shown in Table 4. The depth of focus denotes the range of distances at which an object placed at a given distance ahead of the front end of a lens forms a clear image on a screen placed in contact with the rear end of the lens.

The resolving power, as referred to above, is measured as follows. A chart on which parallel lines are drawn is placed at a position about 30 cm ahead of the lens to be tested, and photographed on a dry plate located just behind the lends. The dry plate is then developed, and the images on it are observed by a microscope. The maximum number of the parallel lines that can be seen separated per mm on the developed dry plate is measured, and made the resolving power.

Further, for testing the weatherability of these glass bodies Nos. 1 –11, they were placed in a closed container containing air maintained at a temperature of 60°C. and a relative humidity of 100 %, and the time at which there appeared changes (tarnishing) in the surface of the glass were visually determined, with the results shown in the table. If the glass demonstrates a weatherability of about 96 hours by the foregoing test, the glass can be regarded as possessing excellent weatherability for practical applications. While the performances of the conventional glass compositions were 48 – 72 hours, the performances of the glass of the present invention exceeded 120 hours.

Thus, as hereinbefore described, the glass bodies of the present invention have the following advantages. (1) Since the melting temperature is low, the dissolution of platinum is small when the glass are melted in a platinum crucible, and since the volatilization of the glass ingredients is reduced, a glass of high transparency and high homogeneity can be obtained. (2) Since the ion-exchange treatment temperature is high, the time required for the ion-exchange treatment for forming the refractive index gradient is short, with the consequence that there is less possibility of the devitrification of the glass occurring during the treatment. (3) Since the weatherability has been improved, there is a marked prolongation of the serviceable life of the glass body.

Further, as a result of the invention, it is now possible to produce a short ion-exchange treatment time refractive index gradient type lenses having an aperture angle of more than 45 degrees, the production of which was a difficult matter in the past. In addition, such lenses can be produced with not only good resolving power and weatherability but also with a great depth of focus. In consequence, the resulting lenses are especially useful as distal objective lenses of such as fiberscopes which require a wide visual field.

In using a refractive index type glass body of the invention as the aforesaid distal objective lens of a fiberscope, usually used is a lens of a length slightly longer than $\pi/(2\sqrt{2a})$, i.e., a lens of a length in which an object about 5 mm forward of the front surface of the lens forms an image at the rear end surface of the lens. Now, when this lens is adhered to the distal surface of an optical fiberbundle of a fiberscope with a transparent adhesive, this lens has a depth of focus of 1 mm – infinity. Hence, a forusing mechanism that was required in the case of the conventional fiberscopes is not need in the case where the invention lens is used.

While the description hereinbefore has been concerning a process for producing a refractive index gradient type glass bodies by the method of effecting the ion exchange by dipping the glass in a molten salt bath, also usable are other processes. For instance, there can be used the process described in Japanese Patent Publication No. 823/1972 which comprises melting the glass in the inside pot of a double platinum pot while melting in the outside pot thereof a different class of glass containing an alkali metal ion, and thereafter effecting the mutual heat-diffusion of the thallium ions contained in the inside pot and the alkali metal ions contained in the outside pot during the step of spinning a glass fiber from said double platinum pot to thus obtain as a consequence a refractive index gradient type glass body.

We claim:

1. An optical glass body selected from rods and/or fibers comprising at its central axis 50 to 70 mol % of $SiO_2$, 10 to 30 mol % of $B_2O_3$, 1 to 25 mol % of $Tl_2O$ and at least 6.5 mol % of $R_2O$, the total proportion of $Tl_2O$ and $R_2O$ being 10 to 30 mol %, the concentration of the thallium ions contained in said glass body gradually decreasing from its central axis to its peripheral surface the concentrations of the components other than $Tl_2O$ and $R_2O$ being each maintained substantially constant in the radial direction in a cross section perpendicular to the central axis, and the total concentration of $Tl_2O + R_2O$ in mol % being maintained substantially constant in the radial direction in a cross section perpendicular to the central axis, with the consequence that the refractive index of the glass body continuously decreases from the central axis of the glass body to its peripheral surface, wherein R is at least one component of the group consisting of the alkali metals.

2. A fiberlike glass body according to claim 1 containing 1.0 – 5.5 mol % of $Tl_2O$ at the central axis of the glass body, said glass body being suitably used for optical communication purposes.

3. A glass body according to claim 2 wherein the $SiO_2$ content at the central axis of the glass body is in the range of 50 – 65 mol %.

4. A glass body according to claim 3 wherein as other ingredients the body contains at its central axis a total of 0 – 15 mol % of at least one ingredient selected from the group consisting of MgO, CaO, BaO, ZnO, PbO, $Al_2O_3$, $SnO_2$ and $TiO_2$.

5. A glass body according to claim 3 wherein as an additional ingredient the body contains at its central axis 2 – 15 mol % of ZnO.

6. A glass body according to claim 1 wherein the content of $Tl_2O$ at the central axis is in the range of 5.5 – 25 mol %, said glass body being suitably used as a lens.

7. A glass body according to claim 1 wherein the composition of the glass body at the central axis thereof is 50 – 65 mol % $SiO_2$, 10 – 25 mol % $B_2O_3$, 5.5 – 25 mol % $Tl_2O$ and 15 – 30 mol % ($Tl_2O + R_2O$), said glass body being suitably used as a lens.

8. A glass body according to claim 7 wherein as other ingredients the body contains at its central axis a total of 1 – 20 mol % of at least one ingredient selected from the group consisting of MgO, CaO, BaO, ZnO, PbO, $Al_2O_3$, $SnO_2$ and $TiO_2$.

9. A glass body according to claim 7 wherein as an additional ingredient the body contains at its central axis, 2 – 15 mol % of ZnO.

10. An optical glass body according to claim 1 wherein the concentration of the ions of at least one metal selected from the group consisting of lithium, sodium, potassium, rubidium and cesium gradually increases from the central axis of the body towards the peripheral surface thereof, the refractive index of said body being expressed by the following equation $$N = N_o (1 - ar^2)$$

wherein $N$ is the refractive index at a distance $r$ from the central axis of the body in a cross section perpendicular to the central axis, and $a$ is a positive constant.

* * * * *